Feb. 25, 1964

G. MAXIM 3,122,275

SALT AND PEPPER SHAKER

Filed Feb. 14, 1962

INVENTOR.
GEORGE MAXIM
BY
Merchant, Merchant & Gould
ATTORNEYS

United States Patent Office 3,122,275
Patented Feb. 25, 1964

3,122,275
SALT AND PEPPER SHAKER
George Maxim, 3775 W. 39th St., Cleveland, Ohio
Filed Feb. 14, 1962, Ser. No. 173,247
1 Claim. (Cl. 222—142.4)

My invention relates to salt and pepper shakers and has for its primary object the provision of a novel arrangement whereby separate salt and pepper containing compartments may be provided in a single housing or body.

A further object of my invention is the provision of a device of the class above described wherein, by virtue of the novel arrangement of compartments, salt and/or pepper may be separately and independently dispensed from open-topped compartments as desired.

A further object of my invention is the provision of a device of the class described which may be formed from a transparent body so as to indicate independently the levels of the contents within the salt and pepper containing compartments.

A further object of my invention is the provision of a device of the class above described which is inexpensive to produce, is easy to store and ship, and is highly efficient in its operation.

The above and still further objects of my invention will become apparent from the following detailed specification, appended claims and attached drawings.

Referring to the drawings wherein like characters indicate like parts throughout the several views.

Figure 1:
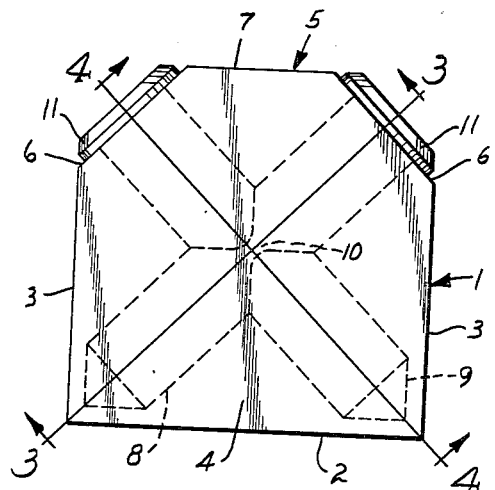
FIG. 1 is a view in front elevation of the salt and pepper dispenser constructed in accordance with my invention.
Figure 2:
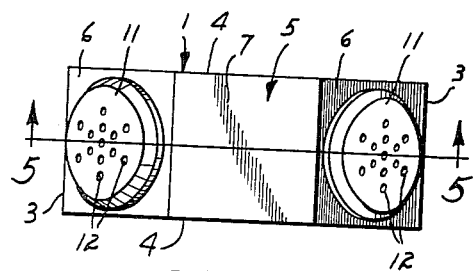
FIG. 2 is a view in top plan.
Figure 5:
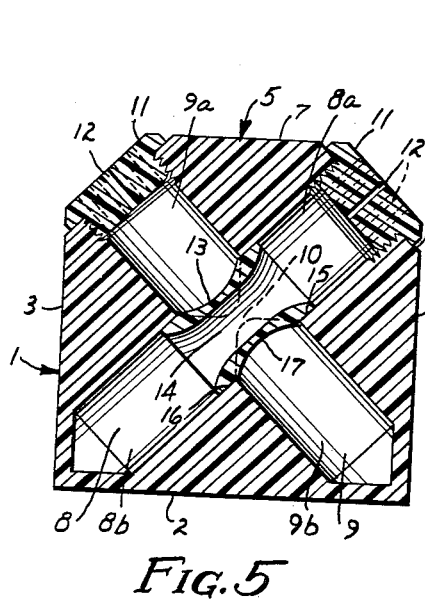
FIG. 5 is a view in section taken on the line 5—5 of FIG. 2.

Referring with greater particularity to the drawings, the numeral 1 indicates in its entirety a body preferably formed from suitable transparent plastic, such as "Lucite." While the body 1 obviously may take specifically different forms, as shown it is generally a rectangular block having a flat bottom 2, parallel end walls 3, flat parallel side walls 4, and a top wall identified in its entirety by the numeral 5 and including beveled side portions 6 and an intermediate horizontal portion 7.

As shown, the body 1 is bored to provide a pair of elongated storage compartments 8, 9, the longitudinal axes of which are disposed in a common vertical plane and which intersect at a point intermediate said compartments, as indicated at 10. Preferably, and as shown, the axes of the compartments 8, 9 are normal to each other and one each thereof opens upwardly through a beveled top wall portion 6, the axes of each of said compartments being normal to the plane of its cooperating wall portion 6.

Each of the compartments 8, 9 is provided with a screw-threaded cap 11 which contains perforations 12 extending parallel to the axis of its respective compartment. The transverse dimensions of the perforations 12 would, of course, vary depending upon whether the compartments 8, 9 are used for storage of salt or pepper.

Figures 3, 4:
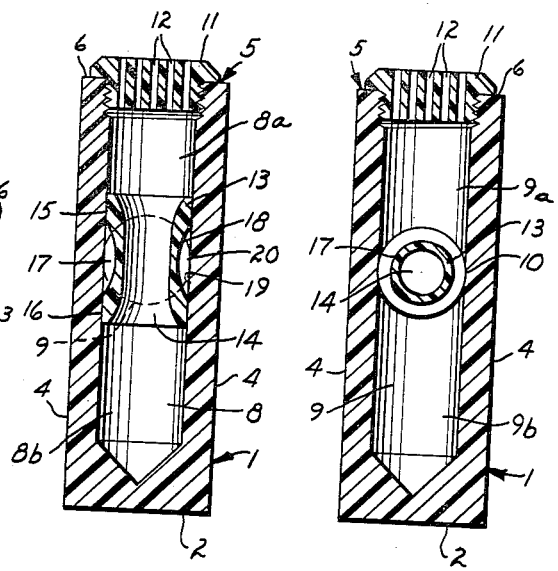
FIG. 3 is a view in section taken on the line 3—3 of FIG. 1.
FIG. 4 is a view in section taken on the line 4—4 of FIG. 1.

Inserted snugly within the compartment 8, at its longitudinal center and spanning the bore of the longitudinally central portion of compartment 9, is an insert 13, also preferably formed of suitable transparent plastic material. At its axial center the insert 13 defines a reduced coaxial passage 14 which communicates between the upper and lower compartment sections 8a and 8b, respectively. As shown, the insert 13 has greater axial dimensions than the diameter of the compartment 9 and its opposite ends are generally cylindrical so as to form a seal as at 15, 16. Intermediate the sealing portions 15, 16 the insert 13 is provided with a circumferentially extended groove 17, the wall 18 of which, as shown in FIG. 3, cooperates with the adjacent wall 19 of the compartment 9 to define passages 20 which communicate between upper and lower compartment sections 9a and 9b, respectively.

With my novel combination shaker, above described, salt within one of the compartments, for instance compartment 8, may be dispensed freely without pepper being released from compartment 9, and vice versa.

My invention has been thoroughly tested and found to be completely satisfactory for the accomplishment of the above objects, and while I have shown a preferred embodiment thereof, I wish it to be understood that same may be capable of modification without departure from the scope and spirit of the appended claim.

What I claim is:

In a device of the class described,
(a) a body defining a pair of elongated cylindrical storage compartments the longitudinal axes of which are disposed in a common vertical plane and which intersect at a point intermediate the ends of said compartments,
(b) said compartments each having cross-sectionally reduced portions adjacent the point of intersection of said axes,
(c) said reduced portions being offset relative to each other in a direction transversely of said plane,
(d) the upper end walls of said compartments being perforated for independent discharge of material therethrough from their respective compartments,
(e) one of said compartments being provided with an insert which defines one of said passages and cooperates with said body to define the other of said passages,
(f) one of said passages in said insert being coaxial with its cooperating bore, the other of said passages being defined in part by an annular groove in the side wall of said insert.

References Cited in the file of this patent

UNITED STATES PATENTS

| D. 194,796 | Ultimo | Mar. 12, 1963 |
| D. 194,797 | Ultimo | Mar. 12, 1963 |
| 1,014,413 | Peri | Jan. 9, 1912 |
| 2,431,049 | Killa | Nov. 18, 1947 |
| 2,582,313 | Dodson | Jan. 15, 1952 |

FOREIGN PATENTS

| 282,986 | Great Britain | Jan. 5, 1928 |
| 645,438 | Great Britain | Nov. 1, 1950 |